United States Patent [19]

Tanaka

[11] Patent Number: 4,912,493
[45] Date of Patent: Mar. 27, 1990

[54] CAMERA SYSTEM

[75] Inventor: Tsunefumi Tanaka, Yokohama, Japan

[73] Assignee: Canon Kabushiki Kaisha, Tokyo, Japan

[21] Appl. No.: 355,873

[22] Filed: May 23, 1989

Related U.S. Application Data

[63] Continuation of Ser. No. 143,712, Jan. 11, 1988, abandoned.

[30] Foreign Application Priority Data

Jan. 12, 1987 [JP] Japan .................................. 62-3135

[51] Int. Cl.⁴ .............................................. G03B 3/00
[52] U.S. Cl. .................................... 354/400; 354/402; 354/406
[58] Field of Search ............... 354/402, 406, 407, 408, 354/409, 286, 400, 401

[56] References Cited

U.S. PATENT DOCUMENTS

| | | | |
|---|---|---|---|
| 3,928,858 | 12/1975 | Sakurada et al. | 354/289.12 X |
| 4,118,713 | 10/1978 | Murakami et al. | 354/289.12 X |
| 4,473,287 | 9/1984 | Fukuhara et al. | 354/402 |
| 4,504,135 | 3/1985 | Kawabata | 354/402 |
| 4,537,487 | 8/1985 | Taniguchi et al. | 354/400 |
| 4,602,861 | 7/1986 | Taniguchi et al. | 354/403 |
| 4,728,785 | 3/1988 | Ohnuki et al. | 354/408 X |
| 4,733,262 | 3/1988 | Taniguchi et al. | 354/402 |
| 4,737,813 | 4/1988 | Ishida et al. | 354/402 X |
| 4,812,868 | 3/1989 | Utagawa et al. | 354/402 |

FOREIGN PATENT DOCUMENTS 61-30989 2/1986 Japan .
62-157016 7/1987 Japan .

Primary Examiner—W. B. Perkey
Attorney, Agent, or Firm—Fitzpatrick, Cella, Harper & Scinto

[57] ABSTRACT

An interchangeable lens for a camera having a focus detecting device includes a memory having a plurality of memory areas. Each of the memory areas stores different correction values for correcting the focus condition of the lens for aberrations. Setting apparatus is coupled to the memory and allows the correction values from one of the memory areas to be enabled in order to carry out correction of the lens focus.

15 Claims, 6 Drawing Sheets

FIG. 1
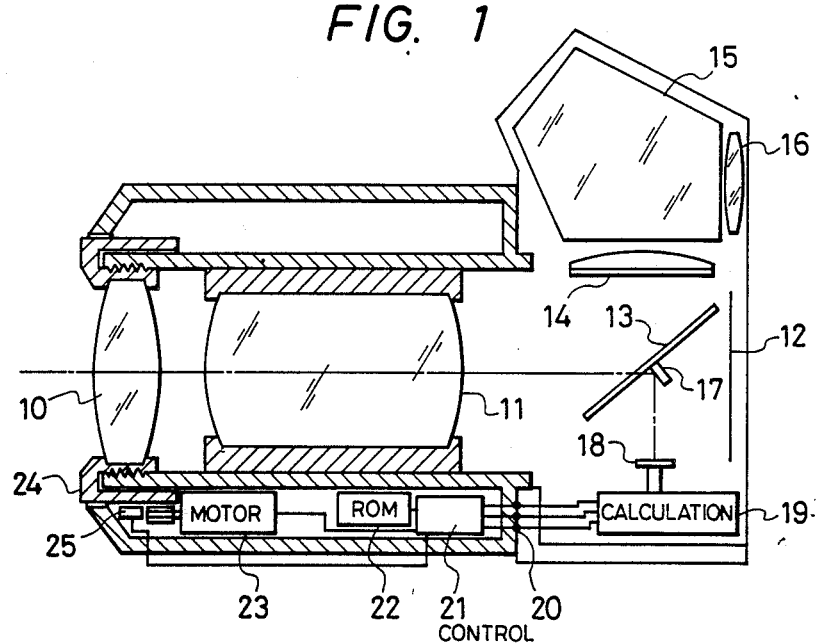
FIG. 4
| ADDRESS | DATA |
|---------|--------|
| 00 | DATA 1 |
| 01 | DATA 2 |
| 10 | DATA 3 |
| 11 | DATA 4 |
FIG. 5
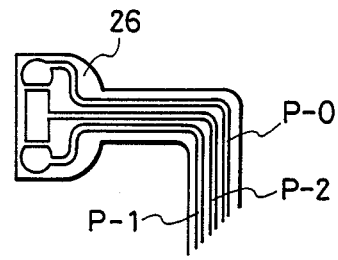
FIG. 6
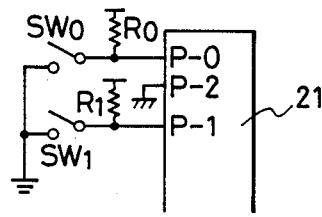

CAMERA SYSTEM

This application is a continuation of application Ser. No. 143,712 filed Jan. 11, 1988, now abandoned.

BACKGROUND OF THE INVENTION

1. Field of the Invention

This invention relates to improvements in a focus detecting apparatus for automatically detecting the position of the point of focus of the photo-taking lens or other lens of a photographic camera, a video camera or the like by the positional relation of a secondary image.

2. Description of the Related Background Art

In a focus detecting apparatus in which a secondary imaging optical system is disposed near a position equivalent to the predetermined imaging surface of a main imaging lens such as a photo-taking lens, the image of an object formed near the position equivalent to the predetermined imaging surface is further separated into a plurality of secondary images. The plurality of secondary images are received by a plurality of light-receiving means and the positional relation between the plurality of secondary images is found to thereby obtain the position of the point of focus of the main imaging lens (the defocus amount from the predetermined imaging surface). Such an apparatus is well known, for example, from U.S. Pat. Nos. 4,559,446 and 4,699,493, etc.

FIGS. 8A and 8B of the accompanying drawings show the construction of said focus detecting apparatus. As shown in FIG. 8A, the pupil 1 of a main imaging lens is imaged on a predetermined imaging surface 2 if the lens is in focus. As shown in FIG. 8B, divided pupils 3 and 4 are projected onto light-receiving elements 7 and 8 by a field lens 5 disposed near (a position equivalent to) the predetermined imaging surface 2 and a secondary imaging lens 6. When the main imaging lens is out of focus, the positional relation between the secondary images on the light-receiving elements 7 and 8 differs from a reference positional relation. Therefore, the position of the point of focus (the defocus amount) can be calculated on the basis of the deviation between the phases of the image signals of the light-receiving elements 7 and 8.

Now, in the above-described focus detecting apparatus, the accurate detection of the position of the point of focus is established where the main imaging lens is an ideal aberrationless lens, where there are aberrations in the main imaging lens, a difference occurs between the calculated position of the point of focus and the best position of the point of focus of the actual main imaging lens. Even if the calculated position of the point of focus is brought into coincidence with the predetermined imaging surface 2, defocus will occur more or less. That is, in the case of a main imaging lens in which spherical aberration is not completely corrected as shown in FIG. 9 of the accompanying drawings, the spherical aberration corresponding to the pupil 1 is a and the spherical aberration corresponding to the divided pupil 3 or 4 is b and therefore, the position of the point of focus at which the contrast is best differs.

Also, in a main imaging lens wherein correction of chromatic aberration is not complete, there may occur a case where the position of the point of focus differs. FIG. 10 of the accompanying drawings is a spectral characteristic graph showing the reason for the focus difference in such a case. In FIG. 10, the abscissa represents the position of the optical axis, and the ordinate represents the amount of light imaged at each position on the optical axis. Curve c is a characteristic curve weighted from the characteristic of a photosensitive material used for ordinary photographic lenses, and d indicates the best position of the point of focus. Curve e is a characteristic curve weighted from the spectral sensitivity characteristic of the light-receiving element used in the focus detecting apparatus, and f indicates the position of the point of focus of the received image. Generally, the characteristic curve c and the characteristic curve e do not coincide with each other and therefore, there occurs a point-of-focus difference g.

As can be seen from the foregoing description, between an ideal main imaging lens and the actual main imaging lens, there occurs a detection error of the position of the point of focus (the defocus amount) in conformity with the remaining amount of aberration.

To overcome the above-noted disadvantage, correction of the aberrations of the main imaging lens can be effected until said detection error becomes sufficiently small, but a much higher degree of correction than that required for the quality of image of a photograph or video is necessary with the result that the apparatus becomes bulky and expensive.

If the setting of the reference position of the secondary image on the light-receiving element is effected by the actual main imaging lens, the detection error will become null in that lens or at the zoom position thereof. However, when interchange of the lens is done or zooming is effected, a detection error will occur. Also, as regards chromatic aberration, correction thereof can be made by the use of a light-receiving element having the same sensitivity as the film sensitivity or by a filter or the like. Such a proposition has already been made, but it is not preferable because in the natural world, the amount of light on the infrared side is great and reception of much infrared light makes photographing in the dark advantageous and also increases accuracy.

SUMMARY OF THE INVENTION

One aspect of the application is to provide a camera system in which a memory circuit for storing therein the point-of-focus difference information corresponding to the difference between the best position of the point of focus and the calculated position of the point of focus of an imaging optical system is provided in a lens, and the calculated position of the point of focus is corrected on the basis of the point-of-focus difference information stored in said memory circuit to ensure the accurate position of the point of focus to be found.

One aspect of the application is to set the amount of deviation between the point-of-focus difference of a standard lens as said point-of-focus difference information, and the point-of-focus difference of other lens as the point-of-focus difference information of each lens.

One aspect of the application is to provide a camera system in which data of different values are input as said point-of-focus difference information to a plurality of memory circuits and one of these input data is selectively selected from outside and the selected value is set as the point-of-focus difference information for the lens in the memory circuits, whereby the setting of said point-of-focus difference information in the memory circuits is simplified.

Other objects of the present invention will become apparent from the following detailed description of preferred embodiments thereof taken in conjunction with the accompanying drawings.

BRIEF DESCRIPTION OF THE DRAWINGS

FIG. 1 is a cross-sectional view showing an embodiment of the present invention.

FIG. 4 shows the memory areas of ROM in another embodiment of the present invention.

FIG. 5 is a plan view showing the flexible terminal plate of the lens side control means in another embodiment of the present invention.

FIG. 6 shows the connection of the flexible terminal plate.

DESCRIPTION OF THE PREFERRED EMBODIMENTS

Figure 2:
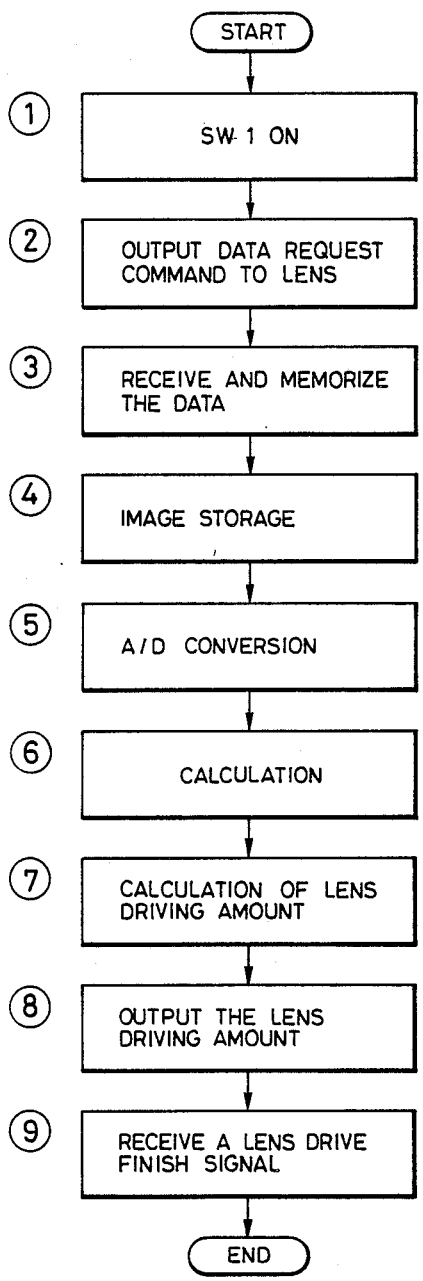
FIG. 2 is a flow chart showing the operation of calculating means in an embodiment of the present invention.

FIG. 1 shows the construction of an embodiment of the present invention which is applied to a single-lens reflex camera.

A photo-taking lens comprising a focusing lens 10 and an imaging lens 11 corresponding to the main imaging lens of the present invention. Photographing is accomplished by the object light passing through these lenses 10 and 11 imaged on a film surface 12. The film surface 12 corresponds to the predetermined imaging surface of the present invention. Observation of the field of view is accomplished through a reflecting mirror 13, a condenser lens 14, a pentagonal prism 15 and an eyepiece 16. Focus detection is accomplished by the object light passed through the focusing lens 10 and the imaging lens 11, transmitted through the half-transmitting portion of the reflecting mirror 13 and reflected by a distance measuring mirror 17 being separated by a field lens and a secondary imaging optical system, not shown. The separated light is a light-receiving element 18, and by the light-receiving element 18 generates an image signal which is converted to a digital signal. The position of the point-of-focus (the defocus amount from the film surface 12) is then calculated by calculating means 19. The calculating means 19 corresponds to the calculating means of the present invention, and also includes the correcting means of the present invention.

On the photo-taking lens side, there are provided lens side control means 21 (connected to the camera side calculating means 19 by contacts 20), ROM 22 corresponding to the memory means of the present invention, and a drive motor 23 for moving the focusing lens 10 in the direction of the optical axis. The ROM 22 stores therein the point-of-focus difference between the position of the point-of-focus calculated by the calculating means 19 and the best position of the point-of-focus of the photo-taking lens as data inherent to the photo-taking lens. The calculating means 19, when calculating the position of the point-of-focus, supplies a data read-out command to the lens side control means 21, which in turn reads out the data of the point-of-focus difference from the ROM 22 and supplies the data to the calculating means 19. The calculating means 19 corrects the calculated position of the point-of-focuss by reference to the data of the point-of-focus difference, calculates the lens driving amount from the corrected position of the point-of-focus and supplies it to the lens side control means 21. The lens side control means 21 drives the drive motor 23 in accordance with to the lens driving amount. A helicoid 24 is moved by the driving of the drive motor 23, and the focusing lens.10 effectes focusing. A pulse output from a pulse pattern formed on the helicoid 24 is counted by a pulse counter 25, and when this count value has become coincident with the lens driving amount, the lens side control means 21 determines that the ordered amount of lens driving has been effected.

The calculation content of the calculating means 19 will now be described in more detail with reference to FIG. 2.

At step 1, it is usual that the focus detecting operation is started by the closing of a photometering switch swl caused by the half-depression (a first stroke) of a shutter button. A distance measuring switch may be provided separately so that the focus detecting operation may be started by the closing thereof. At step 2, a data request command is output to the lens side control means 21. At step 3, the data of the point-of-focus difference read out from the ROM 22 and supplied from the lens side control means 21 is received and temporarily memorized in a memory contained in the calculating means 19. At step 4, the light-receiving element 18 is caused to effect the photoelectric conversion of a secondary image for a predetermined time and to effect image storage. At step 5, the stored image signal is converted to a digital signal by an A/D converter. At step 6, the position of the point-of-focus is calculated on the basis of this digital signal, and the point-of-focus difference is added to the calculated position of the point-of-focus, whereby correction is effected. At step 7, the corrected position of the point-of-focus is converted to the lens driving amount (including the direction of drive), and if this lens driving amount is a value within a predetermined range approximate to zero (within a range which can be regarded as the in-focus range), the focus detecting operation is terminated. If the lens driving amount is a value outside the range which can be regarded as the in-focus range, the lens driving amount is output to the lens side control means 21, whereby the photo-taking lens is moved. When at step 9, a lens drive finish signal is received, the focus detecting operation is terminated.

Figure 3:
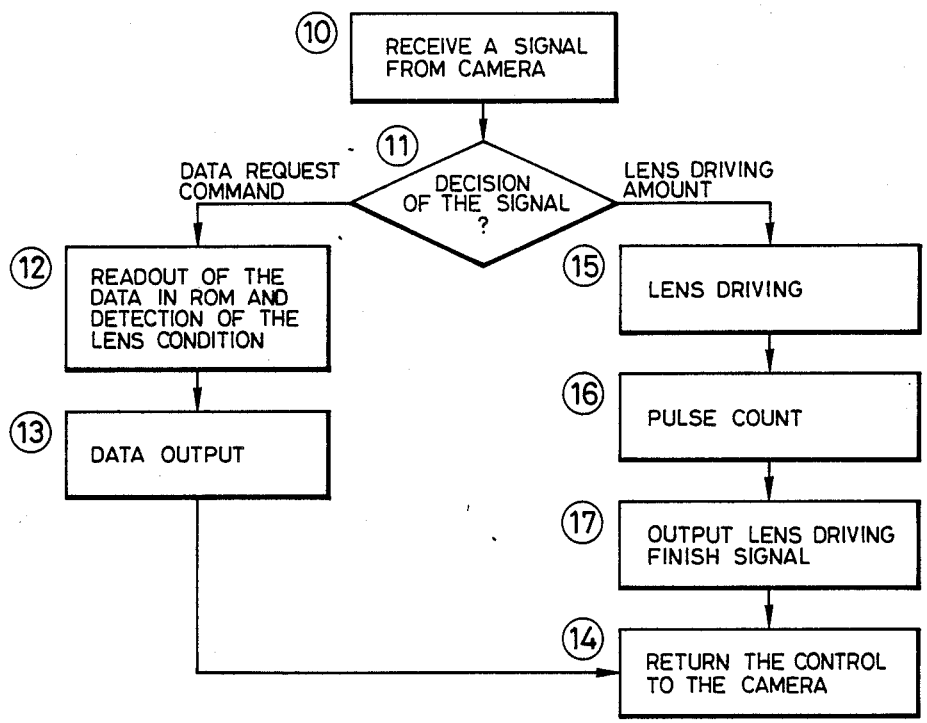
FIG. 3 is a flow chart showing the operation of the lens side control means in an embodiment of the present invention.
Figure 7:
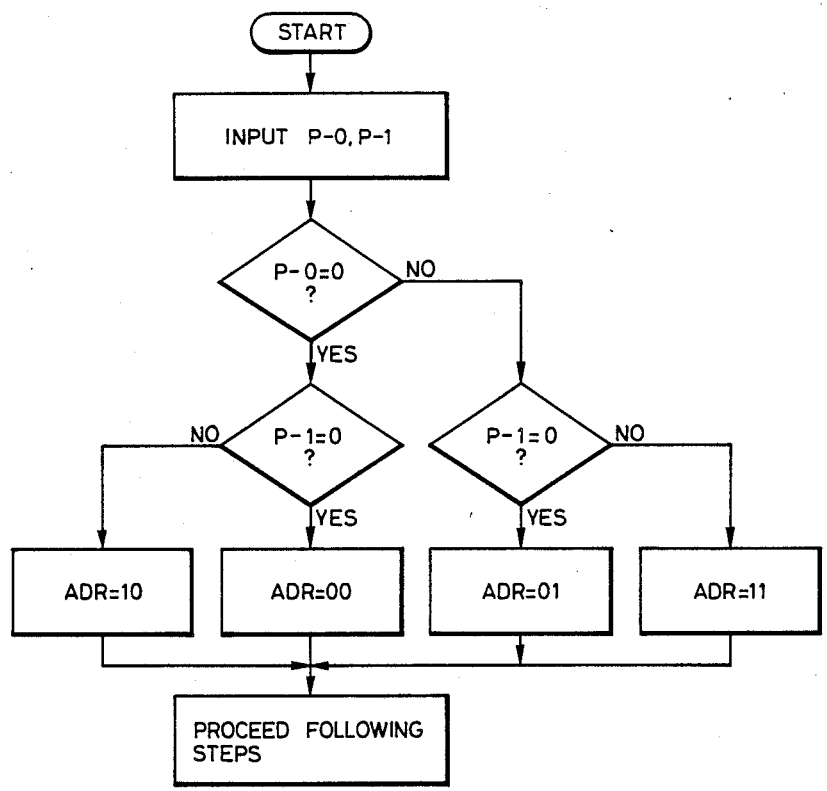
FIG. 7 is a flow chart showing the operation of designating the addresses of the ROM of the lens side control means in another embodiment of the present invention.
Figure 8A:
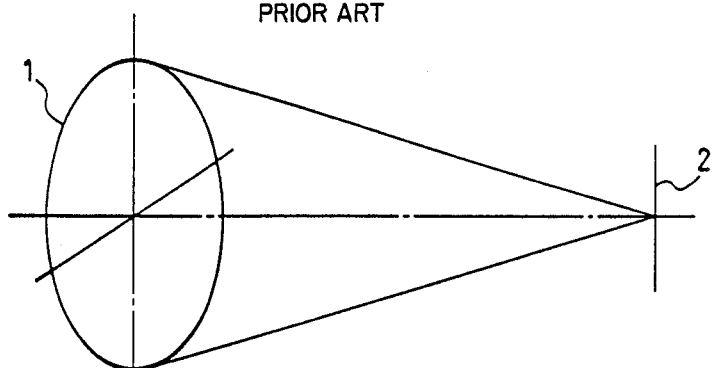
FIGS. 8A and 8B show the construction of the conventional pupil division type focus detecting apparatuses.
Figure 8B:
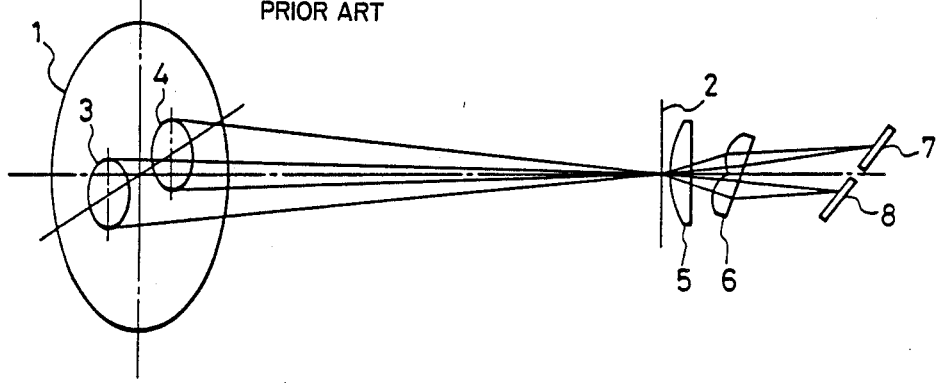
Figure 9:
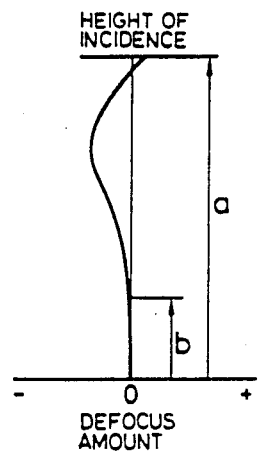
FIG. 9 shows the spherical aberration of the main imaging lens of the FIGS. 8A and 8B apparatuses.
Figure 10:
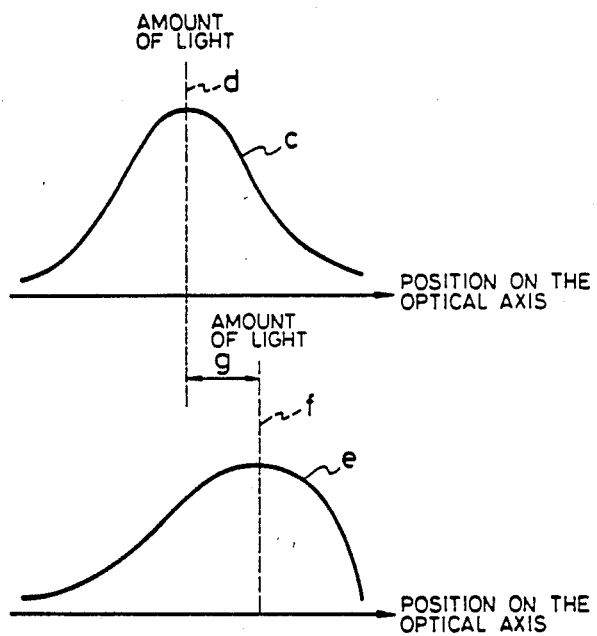
FIG. 10 is a graph showing the point-of-focus difference by the chromatic aberration of the main imaging lens of the FIGS. 8A and 8B apparatuses.

FIG. 3 shows the flow of the operation of the lens side control means 21.

When at step 10, a signal from the camera is received, the signal is discriminated at step 11. If the signal is a data request command, advance is made to step 12, where the data of the point-of-focus difference is read out from the ROM 22, and the lens condition such as the condition of switches provided in various portions of the lens, the zoom position, and the position of the focusing lens 10 is detected. At step 13, the data of the point-of-focus difference and the data of the lens condition are output to the calculating means 19, and at step 14, the control is returned to the camera.

If the signal from the camera is the lens driving amount, advance is made from step 11 to step 15, where the drive motor 23 is electrically energized. At step 16, when it is detected that a counter 25 has counted the pulse number corresponding to the lens driving amount, the power supply to the drive motor 23 is stopped. At step 17, a lens driving finish signal is output to the camera side, and at step 14, the operation is terminated.

According to the present invention, when the lens driving amount is to be calculated, the calculated position of the point-of-focus is corrected in the calculation by the point-of-focus difference which depends on spherical aberration and chromatic aberration. Then the lens driving amount is calculated on the basis of the corrected position of the point-of-focus and therefore, even when use is made of a main imaging lens in which spherical aberration and chromatic aberration are not completely corrected, the best position of the point-of-focus of the main imaging lens can be made exactly coincident with the predetermined imaging surface. The limitation in focusing, i.e., the limitation in the correction of spherical aberration, is elemianted in the aberration correction of the lens, whereby the degree of freedom in designing, and further the degree of freedom in designing called the zest of the lens which extracts the depicting effect in the quality of the image, can be provided. Also, the part dependent on chromatic aberration is included in the memorized point-of-focus difference and therefore, the sensitivity distribution of the light-receiving means can be freely set without chromatic aberration being taken into account, and high accuracy and improved functionality, for example, improved distance measuring capability in the dark, can be achieved.

In the embodiment shown in FIGS. 1 to 3, the point-of-focus difference determined by the optical paraxial standard is used as the data regarding the point-of-focus difference. However, it is preferable that a standard lens be chosen from among interchangeable lenses, and the position of the point-of-focus calculated by the calculating means 19 is preferably adjusted by the standard lens so as to coincide with the best position of the point-of-focus of the standard lens and it is also preferable that the point-of-focus difference between such adjusted and calculated position of the point-of-focus of the standard lens and the best position of the point-of-focus of an interchangeable lens other than the standard lens be used as the data regarding the point-of-focus difference. Thus, it becomes possible to adjust the camera side detecting apparatus with good accuracy. By only mechanically setting up the positional relations among the field lens, the secondary imaging optical system, and the light-receiving element which constitutes the focus detecting apparatus, it is difficult in terms of dimensional accuracy to set the in-focus position with good accuracy and adjustment becomes necessary.

The present invention can be applied not only to an automatic focusing apparatus in which the photo-taking lens is moved by a drive motor, but also to an apparatus in which the photo-taking lens is manually driven in conformity with the result of the detection by a focus detecting apparatus to thereby accomplish focusing. During the judgment of the in-focus condition, the position of the point-of-focus detected by the focus detecting apparatus is corrected on the basis of the data regarding the memorized point-of-focus condition difference, and the in-focus is judged when the corrected position of the point-of-focus coincides with the predetermined imaging surface.

Although in FIG. 1, the lens control means 21 is provided on the lens, the lens control means 21 may be eliminated from the lens and the control may all be effected in the camera body, and the drive motor 23 may also be disposed in the camera body.

The position of the point-of-focus of the photo-taking lens suffers from irregularity to a certain degree even if the accuracy of assembly and the accuracy of parts are improved. With regard to the quality of the image, such irregularity poses no particular problem in practical use, but it provides an error which cannot be neglected when the position of the point-of-focus is automatically adjusted. Now, the position of the point-of-focus of each individual photo-taking lens cannot be measured unless the assembly thereof is completed, and it is impossible to rewrite the content of the ROM 22 after the measurement. It is possible to prepare ROM 22 different in the data regarding the point-of-focus difference, corresponding to the distribution of the irregularity of the position of the point-of-focus of each individual photo-taking lens, but it is very inefficient to interchange the ROM 22 after each assembly.

An embodiment of the present invention which eliminates the above-noted inconvenience is shown in FIGS. 4 to 7.

In the ROM 22, as shown in FIG. 4, there are provided four memory areas designated by four addresses 00-11, and data DATA1-DATA4 regarding the point-of-focus difference determined for different values, with the irregularity of the position of the point-of-focus being taken into account, are stored in the four memory areas. In the lens control means 21 (FIG. 1), there is formed a flexible terminal plate 26 protruding at a location readily accessible from the outside of the lens, as shown in FIG. 5. The flexible terminal plate 26 is provided with three terminals P-0, P-1 and P-2, and as shown in FIG. 6, the terminal P-0 is connected to a power source via a resistor $R_0$ and grounded via a switch $SW_0$. The terminal P-1 is connected to the power source via a resistor $R_1$ and grounded via a switch $SW_1$. The terminal P-2 is directly grounded.

After the photo-taking lens has been assembled, the data regarding the point-of-focus difference is measured, and one of the data DATA1–DATA4 which is most approximate that measured value is selected by the operation of the switches $SW_0$ and $SW_1$ of the lens control means 21. For example, when the data DATA3 is to be selected, the switch $SW_0$ is fixed in its ON position and the switch $SW_1$ is fixed in its OFF position. Thereby, the address 10 (ADR=10) is designated in accordance with the flow shown in FIG. 7 and the data DATA3 is selected. Thereafter, whenever data is read out from the ROM 22 by the lens side control means 21, the ROM 22 outputs the data DATA3.

Although the switches $SW_0$ and $SW_1$ are used in FIG. 6, the connection between the terminals P-0 and P-2 and between the terminals P-1 and P-2 may be directly short-circuited on the flexible terminal plate 26 by soldering, or may be left in its open state without using these switches. For example, when the data DATA3 is to be selected, the connection between the terminals P-0 and P-2 is short-circuited by soldering, and the connection between the terminals P-1 and P-2 is not soldered but is left in its open state.

As described above, according to the present invention, there are provided memory means for memorizing the data regarding the point-of-focus difference between the position of the point-of-focus calculated by the calculating means on the basis of the positional relation of the secondary image and the best position of the point-of-focus of the main imaging lens as data inherent to the main imaging lens, and correcting means for correcting the position of the point-of-focus calculated by the calculating means to the best position of the point-of-focus of the main imaging lens by said data, whereby during the judgment of the in-focus condition and the calculation of the lens driving amount, the calculated position of the point-of-focus is corrected in the calculation by the data regarding the point-of-focus difference dependent on spherical aberration, chromatic aberration and therefore, even when use is made of a main imaging lens in which spherical aberration and chromatic aberration are not completely corrected, the best position of the point-of-focus of the main imaging lens can be detected and at the same time, the sensitivity distribution of the light-receiving means can be freely set without chromatic aberration being taken into account.

We claim:

1. A camera system in which interchangeable lens barrels may be mounted to a camera body, comprising:
   an optical member provided in the camera body for forming an object image at a predetermined imaging position;
   a light-receiving element for receiving the object image from said optical member;
   calculating means for calculating an in-focus position of a lens optical system on the basis of an output of said light-receiving element;
   memory means for storing data regarding a defocus amount produced when the lens optical system is driven to the calculated in-focus position, said memory means being provided in each lens barrel and storing said data as data inherent to the lens barrel in which said memory means is provided, said memory means including a plurality of memory areas each storing different values;
   setting means, coupled to said memory means, for allowing one of said memory areas to be permanently set; and
   correcting means for correcting said defocus amount relative to the in-focus position calculated by said calculating means on the basis of the data stored in the memory area set by said setting means.

2. A camera system according to claim 1, wherein the data regarding the defocus amount comprises a value indicating a difference between a defocus amount of a standard lens barrel and a defocus amount of a lens barrel other than said standard lens barrel.

3. A camera system according to claim 1, wherein said optical member includes a secondary imaging optical member, disposed near the predetermined imaging position, for forming an image on said light-receiving element.

4. A camera system according to claim 3, wherein said secondary imaging optical member separates the object image into a plurality of focus images which are received by said light-receiving element, and wherein said calculating means finds the in-focus position from the positional relation between the focus images received by said light-receiving element.

5. A camera system according to claim 4, further comprising a field lens disposed forwardly of said secondary imaging optical member.

6. A camera system according to claim 1, wherein said setting means comprises a printed plate having a plurality of contact terminals, at least one of said terminals being soldered to effect said permanent setting.

7. An interchangeable lens barrel mountable on a camera having a focus detection circuit, comprising:
   memory means having a plurality of storage areas each storing a different correction value; and
   setting means, coupled to said memory means, for permanently enabling at least one of said storage areas while disabling the remaining storage areas, the enabled storage area providing its correction value to the camera for calculating focus data detected by the focus detection circuit.

8. A camera system according to claim 7, wherein said setting means comprises a printed plate having a plurality of contact terminals, at least one of said terminals being soldered to effect said permanent setting.

9. Lens apparatus for a camera having a focus detection device, comprising:
   memory means having a plurality of storage areas each storing a different set of focus correction data;
   setting means, coupled to said memory means, for permanently at least one of said storage areas, said setting means including a printed plate having a plurality of contact terminals, at least one of said terminals being soldered to effect the permanent setting.

10. A camera system in which interchangeable lens barrels may be mounted to a camera body, comprising:
    an optical member provided in the camera body for forming an object image at a predetermined imaging position;
    a light-receiving element for receiving the object image from said optical member;
    calculating means for calculating an in-focus position of a lens optical system on the basis of an output of said light-receiving element;
    memory means for storing data regarding a defocus amount produced when the lens optical system is driven to the calculated in-focus position, said memory means being provided in each lens barrel and storing said data as data inherent to the lens barrel in which said memory means is provided, said memory means including a plurality of memory areas, each storing different values;
    setting means, coupled to said memory means, for selecting one of said memory areas for use by said calculating means for correcting said defocus amount, said setting means including (1) a printed plate having a plurality of contact terminals, and (2) switch means coupled to said terminals, for selecting data in one of said memory areas by setting said switch means into one of a closed or open condition.

11. An interchangeable lens barrel mountable to a camera having a focus detection device, comprising:
    memory means having a plurality of memory areas each storing different correction data; and
    setting means for selecting an area of said memory means and setting the data of said selected area as data inherent to said lens, said setting means including (1) a printed plate having a plurality of contact terminals, and (2) switch means connected to said terminals for selecting said memory area by being selectively opened or closed, the data selected by said switch means being used as information for correcting focus data detected by the focus detection device.

12. An interchangeable lens mounted on a camera having a control circuit, comprising:

memory means having a plurality of memory areas each storing data of different values; and setting means for setting at least one of said memory areas, and for setting the data stored in the set memory area as data inherent to said lens, said setting means including a printed circuit plate having a plurality of contact terminals, at least one of said terminals being soldered to effect the setting operation for setting the data, said selected data being used as information for said control circuit.

13. A camera system comprising:

a control circuit for controlling photographic operations, said control circuit including calculation means;

memory means having a plurality of memory areas each storing data of different values; and setting means for selecting a memory area of said memory means, and for setting the data of the selected area as data inherent to said camera system, said setting means including a printed plate having a plurality of contact terminals, at least one of said terminals being soldered to effect the operation of data selection, said selected data being used as information for said control circuit.

14. A camera system in which interchangeable lens barrels may be mounted to a camera body, comprising:

a focus detection circuit for detecting a focus state of an optical system;

memory means having a plurality of storage areas each storing a different correction value; and setting means, coupled to said memory means, for permanently enabling at least one of said storage areas while disabling the remaining storage areas, the enabled storage area providing its correction value for correcting focus data detected by said focus detection circuit.

15. A camera system according to claim 14, wherein said setting means comprises (1) a printed plate having a plurality of contact terminals, and (2) switch means coupled to at least one of said terminals, for effecting said permanent setting.

* * * * *

UNITED STATES PATENT AND TRADEMARK OFFICE
CERTIFICATE OF CORRECTION

PATENT NO. : 4,912,493

DATED : March 27, 1990

INVENTOR(S) : Tsunefumi Tanaka

It is certified that error appears in the above-identified patent and that said Letters Patent is hereby corrected as shown below:

COLUMN 1

Line 48, "lens, where" should read --lens. Where--.

COLUMN 2

Line 66, "of" should read --of the--.

COLUMN 3

Line 35, "corresponding" should read --corresponds--;
Line 49, "is a" should read --is received by a--;
Line 50, "by" should be deleted.

COLUMN 4

Line 5, "point-of-focuss" should read --point-of-focus--.

UNITED STATES PATENT AND TRADEMARK OFFICE
CERTIFICATE OF CORRECTION

PATENT NO. : 4,912,493

DATED : March 27, 1990

INVENTOR(S) : Tsunefumi Tanaka

It is certified that error appears in the above-identified patent and that said Letters Patent is hereby corrected as shown below:

COLUMN 5

Line 40, "lens and it" should read --lens. It--;
    Line 47, "detecting" should read
--focus detecting--;
    Line 63, "condition" should be deleted;
    Line 64, "in-focus" should read
--in-focus condition--.

COLUMN 7

Line 10, "aberration," should read
--aberration and--;
    Line 11, "aberration and therefore," should read
--aberration. Therefore,--.

COLUMN 8

Line 20, "permanently at" should read
--permanently setting at--.

Signed and Sealed this

Eighth Day of December, 1992

*Attest:*

DOUGLAS B. COMER

*Attesting Officer*      *Acting Commissioner of Patents and Trademarks*